(12) United States Patent
Shibata (10) Patent No.: US 12,267,444 B2
(45) Date of Patent: Apr. 1, 2025

(54) BLOCKCHAIN SYSTEM WITH IMPROVED THROUGHPUT BY SPLITTING BLOCKS, AND ITS COMPUTER PROGRAM

(71) Applicant: Naoki Shibata, Kyoto (JP)

(72) Inventor: Naoki Shibata, Kyoto (JP)

( * ) Notice: Subject to any disclaimer, the term of this patent is extended or adjusted under 35 U.S.C. 154(b) by 0 days.

(21) Appl. No.: 17/922,022

(22) PCT Filed: Jun. 27, 2022

(86) PCT No.: PCT/JP2022/025600
§ 371 (c)(1),
(2) Date: Oct. 28, 2022

(87) PCT Pub. No.: WO2023/145105
PCT Pub. Date: Aug. 3, 2023

(65) Prior Publication Data
US 2024/0223386 A1    Jul. 4, 2024

(30) Foreign Application Priority Data
Jan. 29, 2022   (JP) ................. 2022-012478

(51) Int. Cl.
*H04L 9/00*    (2022.01)
*H04L 67/104*    (2022.01)
(52) U.S. Cl.
CPC .............. *H04L 9/50* (2022.05); *H04L 67/104* (2013.01)
(58) Field of Classification Search
None
See application file for complete search history.

(56) References Cited

U.S. PATENT DOCUMENTS

| | | | | |
|---|---|---|---|---|
| 2019/0164138 | A1* | 5/2019 | Wright | H04L 9/0643 |
| 2019/0306190 | A1* | 10/2019 | Suraparaju | G06F 21/602 |
| 2019/0370793 | A1* | 12/2019 | Zhu | H04L 9/50 |

(Continued)

FOREIGN PATENT DOCUMENTS

| | | |
|---|---|---|
| JP | 2019-528590 A | 10/2019 |
| JP | 2020-188503 A | 11/2020 |
| JP | 6811504 B2 | 1/2021 |

OTHER PUBLICATIONS

International Search Report of PCT/JP2022/025600 mailed on Oct. 4, 2022.

(Continued)

*Primary Examiner* — Chris Parry
*Assistant Examiner* — Abderrahmen Chouat
(74) *Attorney, Agent, or Firm* — IP Business Solutions, LLC (57) ABSTRACT

A blockchain system is capable of reducing the generation of isolated blocks and unfairness among miners resulting from block propagation delays caused by an increase in block data size. Each block is divided into part A and part B, and transaction information is stored in part B. After the miner receives Part A of a certain block and before the reception of Part B is completed, the miner determines the transaction data to be included in the next block after the received block from the information stored in Part A and starts mining the next block after the received block. In addition, the miner maintains multiple blockchains in case the reception of part B is not completed, and switches the blockchain to be mined according to the conditions.

20 Claims, 2 Drawing Sheets

(56) References Cited

U.S. PATENT DOCUMENTS

| | | | |
|---|---|---|---|
| 2020/0013027 A1 | 1/2020 | Zhu | |
| 2020/0396065 A1* | 12/2020 | Gutierrez-Sheris | ........................ H04L 9/3297 |
| 2021/0182895 A1* | 6/2021 | Sears | ................... G06Q 20/367 |

OTHER PUBLICATIONS

Written Opinion of the International Searching Authority of PCT/JP2022/025600 mailed on Oct. 4, 2022.

Satoshi Nakamoto, "Bitcoin: A Peer-to-Peer Electronic Cash System", www.bitcoin.org, 2008.

Junfeng Xie et at., "A Survey on the Scalability of Blockchain Systems", IEEE Network 33, No. 5, 2019, pp. 166-173.

Surya Viswanathan et al., "The Scalability Trilemma in Blockchain", [Online] https://medium.com/@aakash_13214/thescalability-trilemmain-blockchain-75fb57f646df. Oct. 20, 2018.

Kenny L., "The Blockchain Scalability Problem & the Race for Visa-Like Transaction Speed", The Future of Blockchain Series, [Online] https://towardsdatascience.com/the-blockchain-scalability-problem-the-race-for-visa-liketransaction-speed-5cce48f9d44, Jan. 31, 2019.

Andrei Broder et al., "Network Applications of Bloom Filters: A Survey", Internet Mathematics vol. 1 No. 4: pp. 485-509, Received Apr. 13, 2004; Accepted May 10, 2004.

Naoki Shibata, "Proof-of-Search: Combining Blockchain Consensus Formation With Solving Optimization Problems", IEEE Access, vol. 7, pp. 172994-173006, 2019, Received Nov. 18, 2019; Accepted Nov. 26, 2019; Published Nov. 28, 2019.

"Compact Blocks FAQ", Bitcoin Core, [Online] https://bitcoincore.org/en/2016/06/07/compact-blocks-faq/,2022.

Peter Tschipper, "BUIP010 (passed): Xtreme Thinblocks", Bitcoin Forum, [Online] https://bitco.in/forum/threads/buip010-passed-xtremethinblocks.774/, Jan. 10, 2016.

Hung Dang et al., "Towards Scaling Blockchain Systems via Sharding" National University of Singapore, pp. 123-140, 2019.

\* cited by examiner

BLOCKCHAIN SYSTEM WITH IMPROVED THROUGHPUT BY SPLITTING BLOCKS, AND ITS COMPUTER PROGRAM

CROSS-REFERENCE TO RELATED APPLICATIONS

This is the U.S. National Phase under 35 U.S.C. 371 of International Application No. PCT/JP2022/025600, filed on Jun. 27, 2022, which in turn claims the benefit of Japanese Patent Application No. 2022-12478, filed on Jan. 29, 2022, the disclosures of which are incorporated by reference herein.

BACKGROUND OF THE INVENTION

Field of the Invention

The present invention relates to a method of constructing blocks, information to be stored in the blocks, and a method of mining using the properties of the blocks in such a structure to increase the number of transactions that can be processed per unit of time in the blockchain system, and cryptocurrencies realized thereby.

Description of the Related Art

Since the advent of Bitcoin (Non-Patent Document 1), a number of blockchain-based cryptocurrencies have been developed. Transactions using cryptocurrencies have been increasing every year, and the total market value of cryptocurrencies surpassed $1 trillion in early 2021. A blockchain is data in a list structure, designed in a way that allows new data to be added one after another and to prevent modification of data that have been registered in the past. The history of all transactions in a cryptocurrency is stored in this blockchain. Bitcoin is a fully decentralized cryptocurrency that does not require a central bank or other specific node to transfer coins between users. Transaction history of Bitcoin is recorded in a distributed ledger. A mechanism called Proof of Work (PoW) determines the correct outcome of transactions recorded in the ledger, preventing double use of coins, etc. PoW is used to achieve majority voting in networks where it is easy to secure a large number of IP addresses, and where majority voting for each IP address does not work well. In such an environment, PoW is used to accomplish majority voting in which voting rights are given according to the amount of computational power of each node. Bitcoin's distributed ledger stores a large number of blocks as a linked list. This linked list is called a blockchain. Each block contains multiple items and a hash value of the preceding block. Some of the items are transaction data representing transactions of cryptocurrencies. Users who use the blockchain to conduct transactions of cryptocurrencies create an account on the blockchain in advance. An account is equivalent to a bank account and refers to the data recorded on the blockchain for managing the cryptocurrencies owned by each user on the blockchain. A user who wishes to conduct a transaction broadcasts transaction data representing the transaction to the network, and the transaction data that can be executed without any inconsistency is accepted and recorded in the blockchain. Here, broadcast refers to the transmission of information so that it becomes available to all computers connected to the network. The latest state of each user's account is defined as the result of executing all the transactions that are represented by the transaction data recorded in each block in the blockchain, in order, from the initial state of the account. Each block has an entry to store an integer value called a nonce. Only blocks that have a nonce that makes the hash value of the block start with the required number of zero bits and all transactions in the block can be executed without any inconsistency are accepted as valid blocks. The process of confirming that each transaction in a block can be executed without any inconsistencies is called verification. In PoW, each computer participating in the network (hereafter referred to as a node) collects transaction data broadcast by users, and constructs a new block from successfully verified transaction data. Then each node searches for a nonce that makes the hash value of the new block start with the required number of zero bits. When one of the nodes finds such a nonce, it broadcasts the new block on the network containing that nonce. Then, other nodes that received this block verify it and, if successful, attempt to add a new block after this block. To maintain the network, new coins are awarded as an incentive to the node that successfully adds a new block. A node that attempts to add a block is called a miner. The search for a nonce that makes the hash value of a new block starts with the required number of zero bits in order to add the new block to the blockchain is called mining. Benign miners attempt to add blocks to the longest blockchain known to that node. As long as most CPU resources are used by benign miners to add blocks, the blockchain that records the correct transactions will grow the fastest. Majority voting, in which voting rights are given according to the computational power of each node, is achieved in this way. This mechanism makes it difficult to forge or alter the information recorded in the distributed ledger, and attacks will not succeed unless the CPU resources of the malicious node attempting to forge or otherwise attack exceed the CPU resources possessed by the benign nodes.

A fully decentralized blockchain has a number of good properties, such as not requiring a trusted third party, transparency, anonymity, being democratic and automatic in its operation, and strong security. On the other hand, low scalability, i.e., not being able to process that many transactions, is one of the barriers of using blockchain in real businesses. Three factors that limit blockchain scalability are throughput, storage, and network. Bitcoin's throughput, or the number of transactions it can process in a unit of time, is limited to roughly seven transactions per second, which is significantly less than the VISA system, which can process 2,000 transactions per second. In addition, the original Bitcoin assumes that each miner maintains a history of all transactions made on the blockchain to date, and computers with the storage capacity to hold this enormous amount of data are practically limited. In Bitcoin, the transaction data processed in each block is broadcast to the network twice. The first broadcast is made by a user node when it initiates a transaction of cryptocurrency, and the second broadcast is made when a new block is added to the blockchain, with the transaction data included in a new block broadcast by a miner. This is one of the causes of network congestion and increased block propagation delays. It is also said that there is a trilemma in blockchain between decentralization, scalability, and security, i.e., if one of these three elements is improved, the other two must be sacrificed (Non-Patent Document 2, 3).

The throughput of a blockchain is closely related to the block time, or the interval between block creation, and the data size of the block. The larger the data size of a block, the more transaction data can be stored in a single block, but attempts to improve throughput by increasing the data size of a block face the following challenges. In Bitcoin, the data size to record a single transaction in the blockchain is approximately 250 bytes. If the block time is 10 minutes and the throughput is 1000 transactions per second, the block size becomes 250×1000×60×10=150 Mbytes. A block of this size should be broadcast to all miners immediately after a new block is added. In PoW, it is assumed that all miners begin mining the new block at once immediately after a new block is added. However, the increase in propagation time of a new block increases the probability of a blockchain fork, where there will be a block that is not included in the longest blockchain despite having the correct nonce, called an orphan block. In addition, it takes longer for miners with narrow network bandwidth to be able to begin mining, resulting in inequality among miners. In effect, a tightly connected group of miners with a fast network will have an advantage over the rest, and the decentralized nature of the blockchain will be compromised. The same problem arises for attempts to improve throughput by reducing block time without changing the data size of the block (Non-Patent Documents 2, 4).

A Bloom filter is a probabilistic data structure with which a set of data items can be represented (Non-Patent Document 5). A hash value must be computable for each data item. The size of the Bloom filter is determined by pre-defined parameters. The Bloom filter representing the empty set consists of all zero bits. Two operations are defined for the Bloom filter: adding a new data item to the set and querying whether a data item is included in the set. Here, false positives may occur in the answers to the operations of querying whether a data item is included in the set, i.e., whenever a query returns that a data item is not included in the set, it is not included, but even if a query returns that it is included, it may not actually be included. In exchange for this false positive, the data size of the Bloom filter can be made very small. The parameters of the Bloom filter are the bit length m and the number of hash functions k. The Bloom filter is m bits of data. Each of k hash functions takes a data item as input and returns an integer value greater than or equal to 0 and less than m. A Bloom filter for an empty set consists of m zero bits. To add an element to the set, the k hash function values are obtained for that element and the bits in the positions of those function values are set to 1. To query whether an element is included in the set, the k hash function values are obtained for the element and it is checked whether the bits in the positions of those function values are all ones. If any of these bits are 0, the element is not included in the set. If they are all 1, the element may or may not be included in the set. This is how a false positive occurs. The probability that all of these bits are 1 even though the element is not included in the set can be adjusted by setting the parameters of the Bloom filter appropriately according to the number of elements in the set.

Proof-of-Search (PoS) is an extension of PoW in which computational resources for finding valid nonce values can be used for searching solutions of optimization problems. A combination of a solution candidate and its evaluation score is used as a nonce. In addition, multiple mini-blocks are placed between blocks, where each mini-block contains a nonce. The method of using PoS instead of PoW with the present invention is described later.

Compact Block Relay (BIP152) is a technique for reducing the delay in broadcasting newly added blocks (Non-Patent Document 7, 8). In a blockchain, when a user node makes a transaction of a cryptocurrency, it first broadcasts data representing this transaction to the entire network. The data for this transaction are received by each miner and incorporated into a newly added block as an item, which is then broadcast again to the entire network as part of the block when the block is added to the blockchain by one of the miners. Thus, each miner has already received most of the transaction data contained in the block at the time the block is newly added to the blockchain. In Compact Block Relay, a hash value of each transaction data in the block is sent from a source node to the destination node before sending the entire block. Based on this, the destination miner reconstructs the complete block from the transaction data it has already received from the user node. If the block contains transaction data not held by the destination miner, the destination miner requests the source miner to send the transaction data. Xtreme Thinblocks (Non-Patent Document 9) is an extension of Compact Block Relay that further reduces the data size by using a Bloom filter during the propagation of transaction data IDs. These methods assume that each node completes receiving the complete information of the block when it relays the block to propagate it, and if this condition is not met, the information must be requested. In such cases, a bidirectional communication needs to be made between the transmitting and receiving nodes, which increases the propagation delay time due to the network latency. This becomes more pronounced as the number of transactions in a block increases. On the other hand, the present invention requires only one-way communication from the relay source to the relay destination during block propagation, which is less affected by the communication channel latency and has advantages over Compact Block Relay, which may require a bi-directional communication. The comparison between the present invention and the Compact Block Relay is provided later. Compact Block Relay and the present invention can be used together.

To increase the throughput of Bitcoin, a technique called Segregated Witness or SegWit has been developed and adopted in Bitcoin. This is a technique that separates the digital signature data from the block (Non-Patent Document 10). The absence of the digital signature data from the block makes it possible to store more transactions in the block. This method is independent of the present invention and can be used in conjunction with the present invention.

Off-chain transactions are used to increase the throughput of the blockchain. This is a method of omitting intermediate exchanges of data by grouping multiple transactions together and registering only the final results of those transactions in the blockchain. This method is independent of the present invention and can be used in conjunction with the present invention.

Sharding is a mechanism whereby a blockchain is divided into multiple parts, and each part processes transactions. Multiple blockchains process transactions in parallel, thereby increasing throughput (Non-Patent Document 11). This method is independent of the present invention and can be used in conjunction with the present invention.

PRIOR ART DOCUMENTS

Patent Documents

Patent Document 1: Japanese Patent No. 6811504 B2

Non-Patent Documents

Non-Patent Document1: Nakamoto, S.: Bitcoin: A Peer-to-Peer Electronic Cash System (2008).
Non-Patent Document2: Xie, Junfeng, F. Richard Yu, Tao Huang, Renchao Xie, Jiang Liu, and Yunjie Liu. "A survey on the scalability of blockchain systems." IEEE Network 33, no. 5, 2019, pp. 166-173.

Non-Patent Document3: The Scalability Trilemma in Blockchain, [Online] https://medium.com/@aakash_13214/th-escalability-trilemmain-blockchain-75fb57f646df Non-Patent Document4: Kenny L.: The Blockchain Scalability Problem and the Race for Visa-Like Transaction Speed, [Online] https://towardsdatascience.com/the-blockchain-scalability-problem-the-race-for-visa-liket-ransaction-speed-5cce48f9d44

Non-Patent Document5: Broder, Andrei; Mitzenmacher, Michael, "Network Applications of Bloom Filters: A Survey," Internet Mathematics 1 (4): 485-509, doi:10.1080/15427951.2004.10129096

Non-Patent Document6: N. Shibata, "Proof-of-Search: Combining Blockchain Consensus Formation With Solving Optimization Problems," in IEEE Access, vol. 7, pp. 172994-173006, 2019, doi:10.1109/ACCESS.2019.2956698

Non-Patent Document7: Compact Blocks FAQ, [Online] https://bitcoincore.org/en/2016/06/07/compact-blocks-faq/

Non-Patent Document8: https://en.bitcoin.it/wiki/BIP_0152

Non-Patent Document9: Xtreme Thinblocks, [Online] https://bitco.in/forum/threads/buip010-passed-xtreme-thinblocks.774/

Non-Patent Document10: [Online] https://github.com/bitcoin/bips/blob/master/bip-0141.mediawiki Non-Patent Document11: Dang, Hung, Tien Tuan Anh Dinh, Dumitrel Loghin, Ee-Chien Chang, Qian Lin, and Beng Chin Ooi: "Towards scaling blockchain systems via sharding." In Proceedings of the 2019 international conference on management of data, pp. 123-140. 2019.

SUMMARY OF THE INVENTION

The purpose of the present invention is to reduce the occurrence of orphan blocks and inequality among miners resulting from the propagation delay of blocks caused by the increase in block data size, thereby increasing the number of transactions that can be processed by the blockchain per unit of time.

The blockchain system according to the first invention is a blockchain system operated by nodes participating in a peer-to-peer network. The blockchain system includes a means by which, after a miner adds the last block on the blockchain, another miner determines all transaction data to be included in the block succeeding the last block and then the latter miner mines the block succeeding the last block before the latter miner completes receiving all transaction data included in the last block.

The blockchain system according to the second invention is the blockchain system according to the first invention. The blockchain system further includes a means for a miner to maintain an incomplete blockchain containing incomplete blocks with missing transaction data and to verify the block obtained by combining the transaction data that are fully downloaded after the miner finds the nonce of a block newly added to the incomplete blockchain, with the incomplete block contained in the incomplete blockchain maintained by the miner.

The blockchain system according to the third invention is the blockchain system according to the second invention. The miner is equipped with a means for maintaining a complete blockchain and the incomplete blockchain, a means for evaluating the fitness of each of the complete blockchain and the incomplete blockchain, and a means for mining the blockchain with the highest fitness among them.

The fourth invention is a blockchain system according to the third invention. The blockchain system further includes a means for a miner to compute the set of accounts whose state may change from the state before the addition of a block when the miner adds the block to the blockchain and to make the block include data representing the set, and a means for the system by which another miner mines the next block after the block in such a way that the next block does not contain transaction data for transactions that may change the state of any of the accounts included in the set.

The blockchain system of the fifth invention is a blockchain system of the third invention. The blockchain system further includes a means for a miner to mine a new block with no transaction data before the miner completes receiving all transaction data contained in the last block added to the blockchain by another miner.

The sixth invention is a blockchain system according to the third invention. The blockchain system further includes a miner to compute the set of transaction data contained in a block when the miner adds the block to the blockchain and to make the block include data representing the set, a means for the system by which another miner mines the next block after the block in such a way that the next block does not contain the transaction data included in the set, and a means to add a block containing non-executable transaction data to the blockchain, and the system is characterized by that the latest state of each user's account is the result of executing all transactions recorded in the blockchain in order from the initial state of the account, excluding transactions that cannot be executed.

The seventh invention is a computer program for implementing a blockchain system according to any one of the first to sixth inventions.

Effects of Invention

The present invention reduces the occurrence of orphan blocks and unfairness among miners caused by the propagation delay of blocks due to the increase in block data size, and thus increases the number of transactions that can be processed by the blockchain per unit of time.

DETAILED DESCRIPTION OF THE INVENTION

The following is a description of the embodiment of the invention. It goes without saying that various changes and modifications are possible within the scope that does not depart from the technical scope of the invention.

An orphan block in a blockchain is formed when a miner finds a nonce such that the hash value of a block starts with the required number of zero bits, broadcasts the new block containing that nonce, and before this block propagates throughout the network, another miner finds such a nonce and broadcasts another new block. In this case, two or more of the longest blockchains exist in the network, creating a situation where different miners are mining different blockchains. This is called a blockchain fork. If a miner then adds a block to one of these blockchains, all miners simultaneously change the blockchain to be mined to the one to which the block was added. As a result, the final block of the other blockchain to which no block was added becomes an orphan block. In order to reduce the occurrence of orphan blocks, it is necessary to ensure that all miners can begin mining the next block after a new block as soon as possible after the miner finds the correct nonce for the new block.

Hereafter, the t-th block in the blockchain is denoted as block t. After block t is added to the blockchain, miners begin mining block t+1. The only items that may be included in block t+1 are those that can be executed without inconsistency (such as double use of coins) after all items included in block t are executed. Hereafter, an item i that is not yet registered on the blockchain is said to "be interfered with by item j" if the transaction result of item i is affected by item j on the blockchain. If we know which new items are interfered with by the items in block t, we can begin mining block t+1 by making block t+1 include only items that are not interfered with by the items in block t. In Bitcoin, mining of block t+1 begins after successful verification of the items contained in block t, and the verification of the items in block t is done after the items contained in block t have been received. However, in principle, mining of block t+1 can begin before this verification is completed.

In the present invention, blocks are structured to contain part A and part B. The items contained in the block are stored in part B. Part A of block t corresponds to the block header in Bitcoin and contains the hash value of part A of block t−1 and the hash value of part B of block t. Only blocks such that the hash value of part A of the block satisfies the property P determined by the system and the items contained in the block are executable without inconsistency are accepted into the blockchain as valid blocks. Note, however, that items may be included in part A. For a block to be accepted into the blockchain, the hash value of part A of the block must satisfy property P determined by the system. Property P is the property that a given hash value is contained in the required subset of the set of all possible values of the hash value, although in the Bitcoin it is the property that the hash value starts with the required number of zero bits.

In the present invention, when a miner broadcasts a new block t in order to add it to the blockchain, the miner broadcasts part A of block t in priority to part B. After another miner receives part A of block t, the other miner constructs block t+1 so that block t+1 does not contain items that not be interfered with by items contained in block t, and begins mining for block t+1. The methods for constructing block t+1 so that it does not contain items that not be interfered with by items contained in block t are described later. The blockchain retained by a miner may be an incomplete blockchain that contains incomplete blocks for which the download of part B has not been completed. Hereafter, the incomplete blockchain and the complete blockchain are collectively referred to as a chain. If a miner finds a nonce such that the hash value of part A of a new block satisfies property P, the new block containing this nonce is added to the chain retained by the miner, and the part A of the new block, followed by the rest of the block, is broadcast. If part A of the block is received during the mining process, it is added to the chain if it can be added to the chain without inconsistency. When part B of a block is received, the block obtained by combining it with the already retained part A of the block that corresponds to the received part B is verified, and if successful, the combined block is added to the chain.

There is no guarantee that the download of the missing part B will complete in the future. Therefore, even if a miner finds a nonce such that the hash value of part A of a new block satisfies property P for an incomplete blockchain containing incomplete blocks with missing part B, it is not necessarily a good idea to continue mining for that chain. Also, since mining of block t+1 begins before receiving the items in block t completes, verification of the items in block t must be done after mining of block t+1 has begun. However, in some cases, items in block t are received after finding a nonce such that the hash value of part A of block t+1 satisfies property P. In this case, if the verification of an item in block t fails, both the received block t and the mined block t+1 must be rejected and mining of block t must be restarted. To cope with this situation, in the present invention, several chains are maintained by each miner, and the miner switches the chain to be mined depending on the conditions. In Bitcoin, basically, only the longest blockchain known to the miner is retained and mining is performed only on that blockchain, but in the present invention, each miner retains a list that keeps multiple chains known to the miner, selects the chain to be mined from the chains in the list, and switches according to the conditions.

When a miner begins execution, the list contains only the longest blockchain. When a nonce is found such that the hash value of part A of the new block satisfies property P, or when a portion of a block is received, the miner updates the list by adding it to all chains in the list to which it can be added without inconsistency. If the miner does not hold any chains to which it can add the portion of the received block, it downloads such a chain and adds the portion to the list. In the present invention, a function is provided that calculates the fitness such that it takes a larger value for the chain that is more expected to grow the fastest in the future. Then, when the list is updated, the fitness of each chain in the list is calculated and the target for mining is switched to the chain that has the highest fitness in the list and satisfies the conditions for mining. In addition, to prevent the list from becoming too large, chains that satisfy certain conditions are removed from the list.

The following is an example of the condition for mining a chain: the miner retains part A of all blocks in a chain, knows the nonce values for all blocks such that the hash values satisfy property P, and retains both parts A and B of all blocks before the last M blocks. Here, M is a constant greater than or equal to 0 specified by the system. As a function to compute the fitness of a chain, the number of blocks in the chain may be used as the fitness, for example. The function to calculate the fitness of the chain may incorporate the aforementioned conditions for mining the chain, so that the function returns a large value only when the aforementioned conditions are met. The condition to remove a chain from the list may be that the chain is shorter by a certain number of blocks than the longest chain it holds.

There are several possible ways for miners to determine which items to include in the block succeeding a new block and begin mining, after the new block is added to the blockchain but before all items included in the new block are received.

Hereafter, an item or transaction is said to overwrite an account when the state of an account changes, or may change depending on the conditions, as a result of the execution of that item or transaction. The account state is the information associated with an account and registered on the blockchain that could affect the outcome of transactions associated with that account. The account state is defined as the result of execution of all transactions represented by the transaction data recorded in the blockchain in sequence from the initial state of the account. The balance of an account is included in the account state. An item or transaction is said to refer to an account when the result of its execution depends, or may depend on the state of account depending on the conditions.

Hereafter, we assume that the change of state of an account caused by adding a new block to the blockchain is only caused by the execution of all the items contained in the block. In this case, the set of accounts whose state may be changed by adding a new block C to the blockchain from the state before the block C is added is the union of all the sets of accounts whose state is overwritten by the items in the block C. Note that there may be implementations in which the change of state of an account caused by adding a new block to the blockchain is not only caused by the execution of all items contained in the block. This can be handled by appropriately computing the "set of accounts whose state may be changed from the state before the block was added" according to the implementation.

Figure 1:
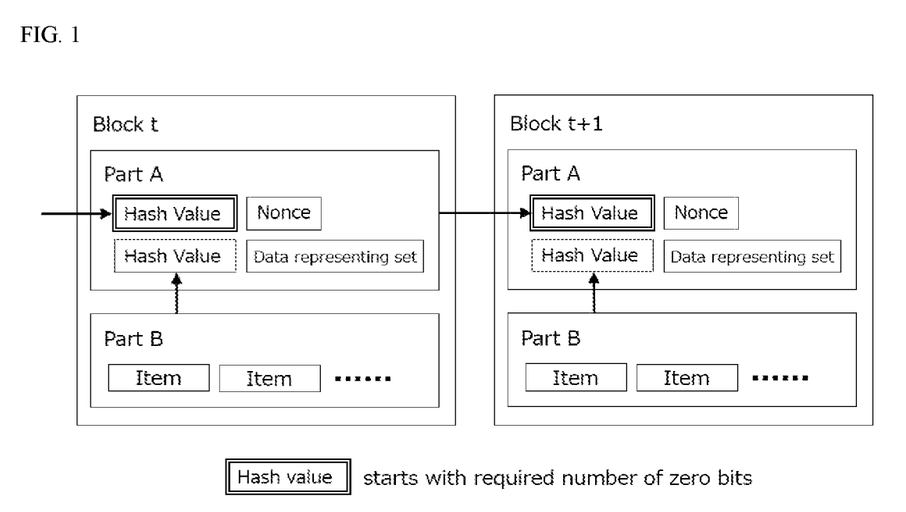
FIG. 1 shows the structure of the blocks in Example 1 and Example 3.

> Method of Example 1—Method by which data representing the set of accounts that will be overwritten by items in a block are included in the block. Example 1 is an example of a method for determining which items may be included in the block succeeding a newly added block before the completion of receiving the new block. In Example 1, data representing the set of accounts to be overwritten by items in a block are included in part A of the block. In this method, data representing the set of accounts to be overwritten by the item included in block t are included in part A of block t and sent before the items in block t. Upon receiving part A of block t, a miner can begin mining block t+1 before receiving part B of block t by making block t+1 include only items that do not refer to any of the accounts represented by the data (FIG. 1).

If the data representing the set of accounts that will be overwritten by items contained in a block are broadcast independently of the block, rather than being included in part A of the block, a malicious node could broadcast the block with data representing an incorrect set that does not correspond to the items actually stored in the block, and this becomes a security concern. By making the block include the data representing the set, the correctness of this set can be verified after the block is added, and the block containing the data representing the incorrect set can be prevented from being accepted into the blockchain. This means that if a malicious node makes a block include data representing an incorrect set, that block will not be accepted, and the malicious node cannot receive the coins that would have been obtained by properly mining that block. Thus, malicious nodes would effectively have to pay a cost equivalent to the mining cost of one block to make the block include the data representing the incorrect set. In this way, the above security concern can be eliminated.

Figure 2:
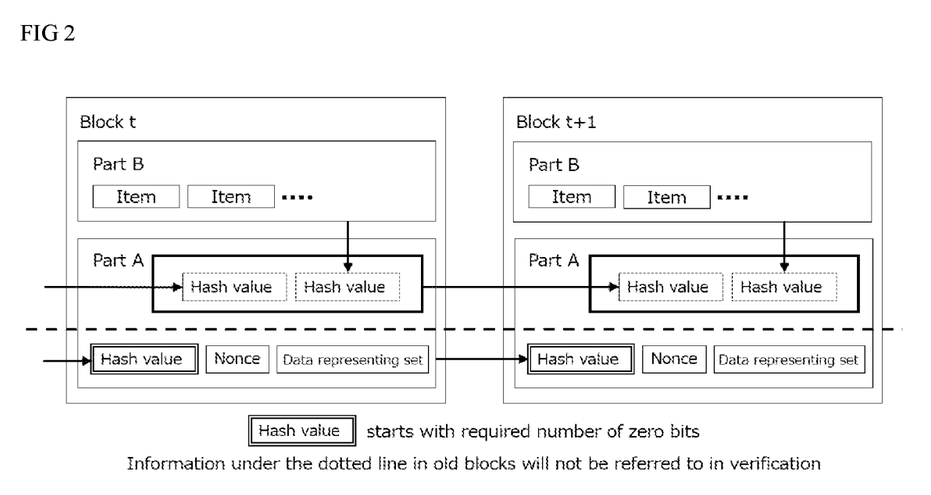
FIG. 2 shows the structure of the blocks for removing data representing sets from older blocks.

The correctness of the data representing the set of accounts overwritten by items in the block needs be checked only when verifying a new block, and not after it is determined that the block is accepted into the blockchain. By structuring the block as shown in FIG. 2, the data representing this set can be removed from the older blocks, reducing the overall data size of the blockchain.

Figure 3:
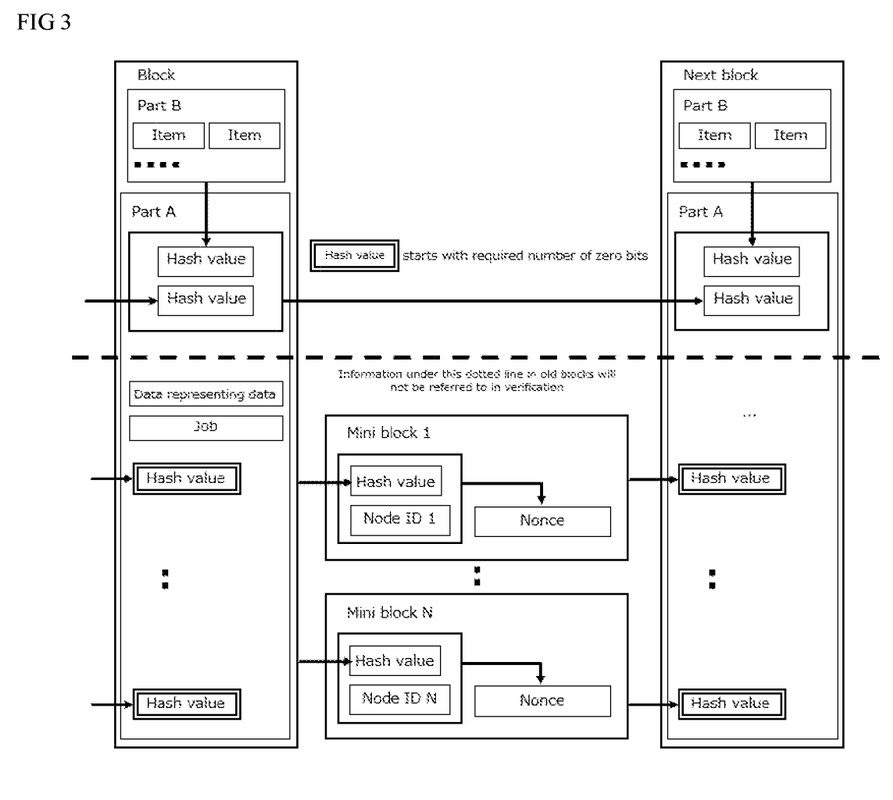
FIG. 3 shows the structure of the block for using Proof-of-Search and the present invention together.

In PoS, all items are contained in a block, and each mini-block contains a hash value, anode ID and a nonce. When PoS is used in conjunction with the present invention instead of PoW, all items contained in the block can be stored in part B, and the remaining part of the block, including the hash value of part B, can be used as part A. In this case, when a miner mines a block, it may broadcast Part A after determining the items to be stored in part B, and broadcast part B after all mini-blocks containing the correct nonce values are added to that block (FIG. 3).

Figure 4:
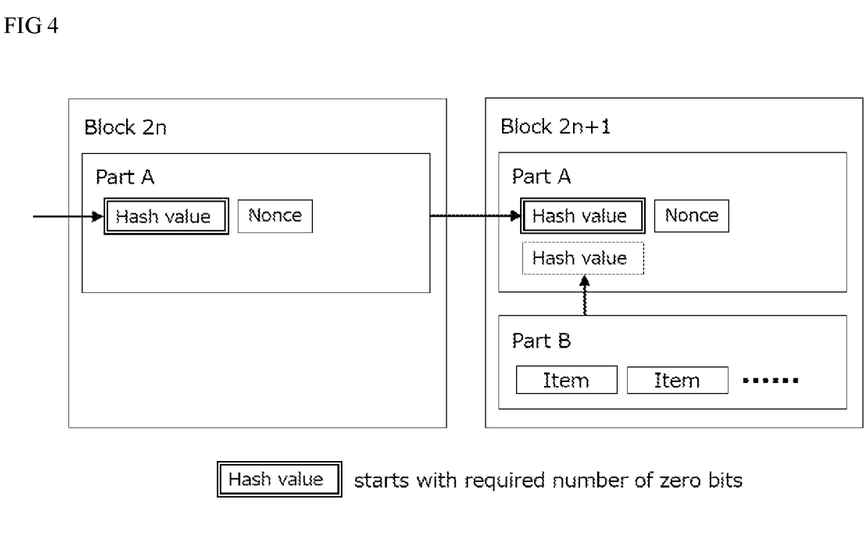
FIG. 4 shows the structure of the blocks in Example 2.

> Method of Example 2—Mining blocks without including any items in the block An alternative method for determining which items can be included in the block succeeding a newly added block before the completion of receiving the new block is to limit the blocks that can contain transaction data to every few blocks. For example, one possible method is to make transaction data only included in odd-numbered blocks and prohibit making transaction data included in even-numbered blocks (FIG. 4). In this case, when a miner finds a nonce such that the hash value of part A of an odd-numbered block satisfies property P, it broadcasts part A of that block containing such a nonce, and then broadcasts part B. Since it is specified that the even-numbered block does not contain any transaction data, other miners that received this part A can mine the next block independently of the transaction data. Thus, each miner can mine the even-numbered blocks without waiting for the completion of receiving part B, and can use the time spent mining the even-numbered blocks as time to propagate part B of the previous odd-numbered block. This method has the disadvantage that the time for mining odd-numbered blocks cannot be used for propagating part B. Shortening the time for mining odd-numbered blocks increases the likelihood that the odd-numbered blocks will become orphan blocks. An example of this method is shown in Example 2. Variations on this method are possible. For example, there can be a method in which mining of a new block without any items is begun immediately after each miner completes receiving part A of the newly added block, and mining of the block containing the items is begun only after the completion of receiving part B. If the latter method is adopted, a high transaction fee is required to encourage miners to mine blocks containing items.

> Method of Example 3—Method that allows non-executable items to be included in the block. The above two methods are approaches in which items that cannot be executed due to insufficient account balance or other reasons are not included in the blockchain. On the other hand, there is another approach in which items that cannot be executed are also included in the block, and the account state is updated by executing only those items that can be executed, ignoring those items that cannot be executed. To avoid duplicate registration of items, the set of items included in the block may be included in part A (instead of the set of accounts). In this approach, after the miner receives part A of block t, the miner checks whether each item is included in the set of items stored in part A upon deciding which items to include in block t+1, and block t+1 is constructed so that items included in the set are not included in the block. Then, mining for block t+1 is performed. Items included in block t+1 that cannot be executed due to insufficient balance or other reasons are included in the block, and the non-executable items registered in the blockchain are ignored in computing the latest state of each account. The verification of a block in this method is to check whether the data representing the set of items in the block are correct. This method has the disadvantage of increasing the size of the blockchain because the blockchain contains transaction data that cannot be executed. An example of this method is shown in Example 3.

How to Represent a Set as Data

A Bloom filter may be used to represent a set of accounts or items. When using a Bloom filter to represent the set of items contained in block t or the set of accounts that are overwritten by items, which are stored in part A, there is a concern about how to handle the false positives. If an account is determined to be overwritten by an item in block t due to a false positive, but the account is not actually overwritten by any of the items in block t, then the items referring to the account will not be included in block t+1. Items not included in block t+1 due to false positives will be included in block t+2 or subsequent blocks without any special action, so no problems other than delays in the execution of the corresponding transactions will occur, and no special processing is required to deal with the false positives. With a 1% probability of false positives and a set size of 2000×60×10 accounts, the size of the Bloom filter is approximately 1.5 Mbytes. This is less than half of the Compact Block Relay (BIP152) data transfer volume of 1000×6×60×10=3.6 Mbytes for 1000 transactions per second.

In addition to using a Bloom filter to represent a set of accounts, etc., there are other methods such as using a Cuckoo filter, an array, a linked list or a hash table to represent a set, and any of these methods or a combination of these methods can be used to represent a set. A set represented by data in a Bloom filter, a Cuckoo filter, an array, a linked list, a hash table, etc., or a combination of these can be further compressed using lossless compression such as range coding, Huffman coding, Golomb coding or run-length coding, and a set may be represented by data compressed using lossless compression.

If the information contained in block t−1 or the previous blocks can be used to identify accounts whose state may be changed by adding block t, then the combination of these accounts and the data stored in part A of block t may be used to represent "the set of accounts whose state may change from the state before block t was added by newly adding block t to the blockchain." A set of accounts may be represented by using an ID that points to a set of accounts defined on the blockchain in advance.

Comparison to Compact Block Relay

The following is a comparison between the present invention and the Compact Block Relay (BIP152). In the Compact Block Relay, when a newly added block is broadcast to the entire network, a hash value of each transaction data is relayed from the source miner to the destination miner. Since the destination miner has already received most of the transaction data from the user node that first broadcast the transaction data, there is no need to receive them again from the source miner. The network bandwidth can be saved by omitting this communication. However, if the relaying miner does not have some of the transaction data yet, it is not possible to identify which of the transaction data that have not accepted into the blockchain can be executed without inconsistency after all the transactions have been executed. To identify them, all of the complete transaction data have to be received. In contrast, the method of Example 1 sends data representing the set of accounts that will be overwritten by items in the newly added block. Accounts not included in this set will not have their state updated by items included in the newly added block, thus ensuring that items that do not refer to these accounts can be executed without inconsistency after all items in the newly added block have been executed. In the present invention, only one-way communication from the sender to the receiver is required for the propagation of part A of the block, so the effect of communication channel latency is minimal. On the other hand, in Compact Block Relay, when a newly added block is broadcast, each miner needs to receive the complete transaction data of all transactions in the block to be added. If a part of them is not retained by the destination miner, the destination miner needs to send a request to the source miner to receive it. For this purpose, bidirectional communication is required between the destination miner and the source miner. The possibility of such cases occurring increases as the number of transactions contained in the block increases. As a result, the Compact Block Relay is affected by the latency of the communication channel. In addition, by delaying the transmission of part B slightly after the transmission of part A of a block, rather than starting it immediately, the present invention allows most of the network bandwidth to be used for the propagation of the part A of the block during this time. With this technique, propagation of part A of the block can be further sped up, allowing the miners to begin mining the next block earlier. However, this technique is not available with Compact Block Relay, and each miner cannot begin mining the next block until all the complete transaction data in the newly added block are received. In addition, based on the calculation, the amount of data to be transmitted can be smaller with the present invention. Compact Block Relay and the present invention can be used together.

Example 1

The blockchain system in Example 1 is an example of the fourth invention and has Algorithm 1 in addition to the configuration of a fully decentralized blockchain system using PoW.

This system is an enhancement of a fully decentralized blockchain system using PoW and uses the same technology with respect to network topology and broadcast methods. The system is configured as a peer-to-peer network. The entire network is loosely connected without any fixed topology. In order for a node to join the network, it needs to know at least one node that has already joined. Each node is connected to several randomly selected nodes. Messages are broadcast by the gossip protocol. Each node keeps a copy of all the information in the blockchain.

To perform a transaction, a user node broadcasts an item representing the contents of the transaction to the network. At each miner, two threads run in parallel. Here, a thread refers to a single sequence of instructions that are executed sequentially on a computer that is capable of parallel processing. Two threads share a list that stores items (hereafter item list). One thread executes Algorithm 1. The other thread continuously receives items and adds them to the end of the item list.

In this example, each block consists of only part A and part B. All items in the block are stored in part B. Part A of block t consists of the hash value of part A of block t−1, the hash value of part B of block t, data (Bloom filter) representing the set of accounts whose state may change from the state before block t was added by newly adding block t to the blockchain, and a nonce (FIG. 1). Part A of each block in the complete blockchain contains a nonce such that the hash value of part A starts with the required number of zero bits.

Each miner maintains a list of chains that can store multiple chains. In this implementation, the chains stored in the chain list contain at least part A of all blocks. Also, for part A of every block, it contains a nonce such that its hash value starts with the required number of zero bits.

Algorithm 1
1. Empty the chain list. Download a complete blockchain and add this blockchain to the chain list.
2. From the chain list, remove all chains that are shorter by a certain number of blocks than the longest chain in the chain list.
3. Evaluate the number of blocks for each chain in the chain list and use this as the chain's fitness value. From the chain list, select the chain with the highest fitness value among those chains in which part A of the last block and both parts A and B for all blocks before the last block are retained. This chain is not deleted from the list at this point. Hereafter, this chain is the chain to be mined. Let t be the number of blocks in this chain.
4. If part B of block t (the last block in the chain to be mined) is retained, all items in the item list that are not included in block t or earlier blocks and have been successfully verified are selected as items to be stored in block t+1.
5. If part B of block t is not retained, then all items in the item list that satisfy the following three conditions are selected as items to be stored in block t+1: the item is not included in block t−1 and earlier blocks, the item is successfully verified and the item does not refer to any of the accounts represented by the "data representing the set of accounts whose state may change from the state before block t was added by newly adding block t to the chain" contained in part A of block t.
6. From the items selected in steps 4 and 5, select the number of items that can be stored in one block to form part B of block t+1, and compute the hash value of part B of block t+1. Compute "the set of accounts whose state may change from the state by adding block t+1 to the chain to be mined" by finding the union set of the sets of accounts that are overwritten by each of all items contained in part B of block t+1. Generate the data (Bloom filter) representing this set, and construct part A of block t+1 from this Bloom filter, the hash value of part B of block t+1, and the hash value of part A of block t.
7. Find a nonce such that the hash value of part A of block t+1 starts with the required number of zero bits.
7a. If a nonce is found in the process of step 7 such that the hash value of part A of block t+1 starts with the required number of zero bits: Add part A and part B of block t+1 containing the found nonce to the chain currently being mined in the chain list, and broadcast part A and part B of block t+1. Go to Step 2.
7b. If part A of a block is received in the process of Step 7: Add the chain ending with the received block to the chain list. If the chain does not contain part A or part B of the block prior to the received block, download and add them to the list. Go to Step 2.
7c. If the miner completed receiving part B of a block in the process of Step 7: The received block is called block u. For each block K with missing part B in the chain list, if the hash value of part B of block K contained in part A of block K and the hash value of part B of block u match, and the data (Bloom filter) obtained from part B of block u representing "the set of accounts whose state may change from the state before block u was added by adding a new block u to the blockchain" and the Bloom filter contained in part A of block K match, then verify all items stored in part B of block u. If successful, add part B of block u to block K. Go to Step 2.

Example 2

The blockchain system in Example 2 is an example of the fifth invention and has Algorithm 2 in addition to the configuration of a fully decentralized blockchain system using PoW.

This system is an enhancement of a fully decentralized blockchain system using PoW and uses the same technology with respect to network topology and broadcast methods. The system is configured as a peer-to-peer network. The entire network is loosely connected without any fixed topology. In order for a node to join the network, it needs to know at least one node that has already joined. Each node is connected to several randomly selected nodes. Messages are broadcast by the gossip protocol. Each node keeps a copy of all the information in the blockchain.

To perform a transaction, a user node broadcasts an item representing the contents of the transaction to the network. At each miner, two threads run in parallel. One thread executes Algorithm 2. The other thread continuously receives items and adds them to the end of the item list.

In this example, each odd-numbered block consists of only part A and part B. All items in a block are stored in part B. Part A of an odd-numbered block consists of the hash value of part B of this block, the hash value of part A of the previous block, and a nonce value. Each even-numbered block consists of only part A. This part A consists of the hash value of part A of the previous block and a nonce value (FIG. 4). In this example, part A of each block in the complete blockchain contains a nonce such that the hash value of part A starts with the required number of zero bits. Note that the blockchain starts with an odd-numbered block.

Each miner maintains a chain list that can store multiple chains. In this implementation, the chains stored in the chain list have at least part A for all blocks. Also, for part A of every block, it contains a nonce in part A such that its hash value starts with the required number of zero bits.

Algorithm 2
1. Empty the chain list. Download a complete blockchain and add this blockchain to the chain list.
2. From the chain list, remove all chains that are shorter by a certain number of blocks than the longest chain in the chain list.
3. Evaluate the number of blocks for each chain in the chain list and use this as the chain's fitness value. From the chain list, select the chain that consists of an even number of blocks and part B of the last odd-numbered block is retained, or the chain that consists of an odd number of blocks, whichever has the highest fitness value. This chain is not deleted from the list at this point. Hereafter, this chain is the chain to be mined. Let t be the number of blocks in this chain.
4. If block t (the last block in the chain to be mined) is the odd-numbered block: No items are included in block t+1, and part A of block t+1 is constructed from the hash value of part A of block t.
5. If block t is an even-numbered block: Among the items in the item list, all items that are not included in the blockchain to be mined and have been successfully verified are selected as items to be stored in block t+1. From these items, items that can be stored in a single block are further selected to form part B of block t+1, and the hash value of part B of block t+1 is calculated.

From this hash value and the hash value of part A of block t, part A of block t+1 is constructed.

6. Find a nonce such that the hash value of part A of block t+1 starts with the required number of zero bits.

6a. If a nonce is found in the process of step 6 such that the hash value of part A of block t+1 starts with the required number of zero bits: Add the entire block t+1 containing the found nonce to the chain currently being mined in the chain list. Broadcast part A of block t+1, followed by the rest of block t+1. Go to Step 2.

6b. If part A of a block is received in the process of Step 6: Add the chain ending with the received block to the chain list. If the chain does not contain part A or part B of the block prior to the received block, download and add them to the list. Go to Step 2.

6c. If the miner completed receiving part B of a block in the process of Step 6: The received block is called block u. For each block K with missing part B in the chain list, if the hash value of part B of block K contained in part A of block K matches the hash value of part B of block u, all items stored in part B of block u are verified and if successful, part B of block u is added to block K. Go to Step 2.

Example 3

The blockchain system in Example 3 is an example of the sixth invention and has Algorithm 3 in addition to the configuration of a fully decentralized blockchain system using PoW.

This system is an enhancement of a fully decentralized blockchain system using PoW and uses the same technology with respect to network topology and broadcast methods.

The system is configured as a peer-to-peer network. The entire network is loosely connected without any fixed topology. In order for a node to join the network, it needs to know at least one node that has already joined. Each node is connected to several randomly selected nodes. Messages are broadcast by the gossip protocol. Each node keeps a copy of all the information in the blockchain.

To perform a transaction, a user node broadcasts an item representing the contents of the transaction to the network. At each miner, two threads run in parallel. One thread executes Algorithm 3. The other thread continuously receives items and adds them to the end of the item list.

In this example, transaction data for transactions that cannot be executed are also recorded in the blockchain. The latest state of each user's account is defined as the result of executing, from the initial state of the account, all of the transactions that the item represents recorded in the blockchain, in order, except for the transactions that cannot be executed.

In this example, each block consists of only part A and part B. All items contained in the block are stored in part B. Part A of block t consists of the hash value of part A of block t−1, the hash value of part B of block t, data (Bloom filter) representing the set of all items contained in block t, and a nonce (FIG. 1). Part A of each block in the complete blockchain contains a nonce such that the hash value of part A starts with the required number of zero bits.

Each miner retains a chain list that can store multiple chains. In this implementation, the chains stored in the chain list have at least part A for all blocks. Also, part A of every block contains a nonce such that the hash value starts with the required number of zero bits.

Algorithm 3

1. Empty the chain list. Download a complete blockchain and add this blockchain to the chain list.
2. From the chain list, remove all chains that are shorter by a certain number of blocks than the longest chain in the chain list.
3. Evaluate the number of blocks for each chain in the chain list and use this as the chain's fitness value.

From the chain list, select the chain with the highest fitness value among those chains in which part A of the last block and both parts A and B for all blocks before the last block are retained. This chain is not deleted from the list at this point. Hereafter, this chain is the chain to be mined. Let t be the number of blocks in this chain.

4. If part B of block t (the last block in the chain to be mined) is retained, all items in the item list that are not included in block t or earlier blocks and have been successfully verified are selected as items to be stored in block t+1.
5. If part B of block t is not retained, then all items in the item list that satisfy the following three conditions are selected as items to be stored in block t+1: the item is not included in block t−1 and earlier blocks, the item is successfully verified and the item is not included in the set represented by the "data representing the set of all items in block t" contained in part A of block t.
6. From the items selected in steps 4 and 5, select the number of items that can be stored in one block to form part B of block t+1, and compute the hash value of part B of block t+1. Generate the data (Bloom filter) representing the set of all items in part B of block t+1, and construct part A of block t+1 from this Bloom filter, the hash value of part B of block t+1, and the hash value of part A of block t.
7. Find a nonce such that the hash value of part A of block t+1 starts with the required number of zero bits.

7a. If a nonce is found in the process of step 7 such that the hash value of part A of block t+1 starts with the required number of zero bits: Add part A and part B of block t+1 containing the found nonce to the chain currently being mined in the chain list, and broadcast part A and part B of block t+1. Go to Step 2.

7b. If part A of a block is received in the process of Step 7: Add the chain ending with the received block to the chain list. If the chain does not contain part A or part B of the block prior to the received block, download and add them to the list. Go to Step 2.

7c. If the miner completed receiving part B of a block in the process of Step 7: The received block is called block u. For each block K with missing part B in the chain list, if the hash value of part B of block K contained in part A of block K and the hash value of part B of block u match, and the data (Bloom filter) obtained from part B of block u representing "the set of all items in part B of block u" and the Bloom filter contained in part A of block K match, then verify all items stored in part B of block u. If successful, add part B of block u to block K. Go to Step 2.

INDUSTRIAL APPLICABILITY

The blockchain system of the present invention is also applicable to existing blockchain systems for trading various cryptocurrencies. Even in those systems, the number of transactions that the blockchain can process per unit of time can be increased.

The invention claimed is:

1. A blockchain system comprising:
nodes participating in a peer-to-peer network including a blockchain,
wherein each node is a computer including a processor, and a node that attempts to add a new block to a blockchain is called a miner,
wherein the nodes include a plurality of miners comprising a first miner which attempts to add a first new block to the blockchain, and a second miner which attempts to add a second new block to the blockchain,
a processor of the second miner, after a processor of the first miner adds the first new block to the blockchain, determines all transaction data to be included in the second new block succeeding the first new block, and
a processor of the second miner begins mining the second new block succeeding the first new block before the second miner completes receiving all transaction data included in the first new block.

2. The blockchain system of claim 1, wherein the plurality of miners includes a third miner, and a processor of any one of the plurality of miners maintains an incomplete blockchain containing an incomplete block with missing transaction data and verifies a third new block obtained by combining the transaction data that are fully downloaded after a processor of the third miner finds a nonce of a fourth new block to be newly added to the incomplete blockchain, with the incomplete block contained in the incomplete blockchain maintained by the third miner.

3. The blockchain system of claim 2, further comprising:
a fitness function determined by the blockchain system, and the fitness function outputting a value used for an evaluation of a block chain that is expected to grow the fastest in the future,
wherein the plurality of miners includes a fourth miner, and a processor of the fourth miner maintains a complete blockchain and the incomplete blockchain and evaluates the fitness function for each of the complete blockchain and the incomplete blockchain and mines a fifth new block to one of the plurality of blockchains with the largest value of the fitness function.

4. The blockchain system of claim 2, wherein the plurality of miners includes a fifth miner, and a processor of the fifth miner maintains a complete blockchain and the incomplete blockchain, and the processor of the fifth miner counts a number of blocks in each of the complete blockchain and the incomplete blockchain and mines a sixth new block to one of the plurality of blockchains with the largest number of blocks.

5. The blockchain system according to claim 3, wherein the processor of the fourth miner computes a set of accounts whose state has a possibility to change from a state before an addition of the fifth new block when the fourth miner adds the fifth new block to the blockchain and makes the fifth new block including data representing the set of accounts
wherein the blockchain system is characterized by which a processor of another miner mines a next block after the fifth new block in such a way that the next block does not contain transaction data for transactions that change the state of any of the accounts included in the set of accounts.

6. The blockchain system according to claim 3 wherein the plurality of miners includes a sixth miner, and a processor of the sixth miner mines a seventh new block with no transaction data before a processor of the sixth miner completes receiving all transaction data contained in the fifth new block added to the blockchain by the fourth miner.

7. The blockchain system according to claim 3, wherein the plurality of miners includes a seventh miner, and a processor of the seventh miner computes a set of transaction data contained in an eighth new block when the seventh miner adds the eighth new block to one of the blockchains and makes the eighth new block including data representing the set of transaction data,
wherein the blockchain system is characterized by which a processor of another miner mines a next block after the eighth new block in such a way that the next block does not contain the transaction data included in the set of transaction data, and the blockchain system is characterized by which a processor of another miner adds a block containing non-executable transaction data to the blockchain, and the blockchain system is characterized by that the latest state of each user's account is a result of executing all transactions recorded in the blockchain in order from an initial state of the each user's account, excluding transactions that cannot be executed.

8. The blockchain system according to claim 4, wherein the processor of the fifth miner computes a set of accounts whose state has a possibility to change from a state before an addition of the sixth new block when the fifth miner adds the sixth new block to the blockchain and makes the sixth new block including data representing the set of accounts, and
wherein the blockchain system is characterized by which a processor of another miner mines a next block after the sixth new block in such a way that the next block does not contain transaction data for transactions that change the state of any of the accounts included in the set of accounts.

9. The blockchain system according to claim 4, wherein the plurality of miners includes an eighth miner, and a processor of the eighth miner mines a ninth new block with no transaction data before a processor of the eighth miner completes receiving all transaction data contained in the sixth new block added to the blockchain by the fifth miner.

10. The blockchain system according to claim 4, wherein the plurality of miners includes a ninth miner, and a processor of the ninth miner computes a set of transaction data contained in a tenth new block when the ninth miner adds the tenth new block to one of the blockchains and makes the tenth new block including data representing the set of transaction data,
wherein the blockchain system is characterized by which a processor of another miner mines a next block after the tenth new block in such a way that the next block does not contain the transaction data included in the set of transaction data, and the blockchain system is characterized by which a processor of another miner adds a block containing non-executable transaction data to the blockchain, and the blockchain system is characterized by that the latest state of each user's account is a result of executing all transactions recorded in the blockchain in order from an initial state of the each user's account, excluding transactions that cannot be executed.

11. A non-transitory computer readable medium storing computer program for implementing a blockchain system operated by nodes participating in a peer-to-peer network including a blockchain and adding a block to the blockchain, wherein each node is a computer including a processor, and a node that attempts to add a block to a blockchain is called a miner, and when the computer program is executed, the blockchain system performs the steps comprising:

adding a first new block to the blockchain by a processor of a first miner, after a processor of the first miner adds the first new block on the blockchain, determining all transaction data to be included in the second new block succeeding the first new block by a processor of a second miner, and beginning to mine a second new block succeeding the first new block by the processor of the second miner before the second miner completes receiving all transaction data included in the first block.

12. The non-transitory computer readable medium according to claim 11, wherein a processor of any one of the plurality of miners maintains an incomplete blockchain containing an incomplete block with missing transaction data and verifies a third new block obtained by combining the transaction data that are fully downloaded by a processor of a third miner after a processor of the third miner finds a nonce of the fourth new block to be newly added to the incomplete blockchain, with the incomplete block contained in the incomplete blockchain maintained by the third miner.

13. The non-transitory computer readable medium according to claim 12, further comprising: a fitness function determined by the blockchain system, and the fitness function outputting a value used for an evaluation of a block chain that is expected to grow the fastest in the future, wherein a processor of a fourth miner maintains a complete blockchain and the incomplete blockchain and evaluates the fitness function for each of the complete blockchain and the incomplete blockchain and mines a fifth new block to one of the plurality of blockchains with the largest value of the fitness function.

14. The non-transitory computer readable medium according to claim 12, wherein a plurality of miners includes a fifth miner, and a processor of the fifth miner maintains a complete blockchain and the incomplete blockchain, and counting a number of blocks in each of the complete blockchain and the incomplete blockchain by the processor of the fifth miner and mining a sixth new block to one of the plurality of blockchains with the largest number of blocks by the fifth miner.

15. The non-transitory computer readable medium according to claim 13, further comprising:

by the processor of the fourth miner, computing a set of accounts whose state has a possibility to change from a state before an addition of the fifth new block when the fourth miner adds the fifth new block to the blockchain and making the fifth new block including data representing the set of accounts, and wherein the blockchain system is characterized by which another miner mines a next block after the fifth new block in such a way that the next block does not contain transaction data for transactions that change the state of any of the accounts included in the set of accounts.

16. The non-transitory computer readable medium according to claim 13, further comprising: mining a seventh new block with no transaction data by a processor of a sixth miner before the sixth miner completes receiving all transaction data contained in the fifth new block added to the blockchain by the fourth miner.

17. The non-transitory computer readable medium according to claim 13, further comprising:

by a processor of a seventh miner, computing a set of transaction data contained in an eighth new block when the seventh miner adds the eighth new block to one of the blockchains and making the eighth new block including data representing the set of transaction data, wherein the blockchain system is characterized by which a processor of another miner mines a next block after the eighth new block in such a way that the next block does not contain the transaction data included in the set of transaction data, and the blockchain system is characterized by which a processor of another miner adds a block containing non-executable transaction data to the blockchain, and the blockchain system is characterized by that the latest state of each user's account is a result of executing all transactions recorded in the blockchain in order from an initial state of the each user's account, excluding transactions that cannot be executed.

18. The non-transitory computer readable medium according to claim 14, further comprising:

by the processor of the fifth miner, computing a set of accounts whose state has a possibility to change from a state before an addition of the sixth new block when a processor of the fifth miner adds the sixth new block to the blockchain and making the sixth new block including data representing the set of accounts, and wherein the blockchain system is characterized by which a processor of another miner mines a next block after the sixth new block in such a way that the next block does not contain transaction data for transactions that change the state of any of the accounts included in the set of accounts.

19. The non-transitory computer readable medium according to claim 14, a processor of the eighth miner mines a ninth new block with no transaction data before a processor of the eighth miner completes receiving all transaction data contained in the sixth new block added to the blockchain by a processor of the fifth miner.

20. The non-transitory computer readable medium according to claim 14, further comprising:

by a processor of a ninth miner, computing the set of transaction data contained in a tenth new block when a processor of the ninth miner adds the tenth new block to one of the blockchains and making the tenth new block including data representing the set of transaction data, wherein the blockchain system is characterized by which a processor of another miner mines a next block after the tenth new block in such a way that the next block does not contain the transaction data included in the set of transaction data, and the blockchain system is characterized by which a processor of another miner adds a block containing non-executable transaction data to the blockchain, and the blockchain system is characterized by that the latest state of each user's account is a result of executing all transactions recorded in the blockchain in order from an initial state of the each user's account, excluding transactions that cannot be executed.

* * * * *